(12) United States Patent
Stark et al.

(10) Patent No.: US 7,224,969 B2
(45) Date of Patent: May 29, 2007

(54) TELEMATICS HOTLINING PROCESS

(75) Inventors: Brett G. Stark, Libertyville, IL (US); Oddy N. Khamharn, Gurnee, IL (US)

(73) Assignee: Temic Automotive of North America, Inc., Deer Park, IL (US)

( * ) Notice: Subject to any disclaimer, the term of this patent is extended or adjusted under 35 U.S.C. 154(b) by 355 days.

(21) Appl. No.: 10/975,822

(22) Filed: Oct. 28, 2004

(65) Prior Publication Data
US 2006/0094473 A1  May 4, 2006

(51) Int. Cl.
H04Q 7/20 (2006.01)
(52) U.S. Cl. ............... 455/432.3; 455/435.3; 455/446
(58) Field of Classification Search ............ 455/432.1, 455/433, 432.3, 405, 406, 445, 422.1, 435.1, 455/435.2, 435.3, 446
See application file for complete search history.

(56) References Cited

U.S. PATENT DOCUMENTS

| | | |
|---|---|---|
| 5,077,790 A | 12/1991 | D'Amico et al. |
| 5,797,101 A | 8/1998 | Osmani et al. |
| 5,887,253 A | 3/1999 | O'Neill |
| 6,081,712 A | 6/2000 | Buettner |
| 6,253,081 B1 | 6/2001 | Koster |
| 6,587,684 B1 | 7/2003 | Hsu et al. |
| 6,816,727 B2 | 11/2004 | Cox et al. |
| 7,103,358 B2 * | 9/2006 | Rodriguez et al. ....... 455/432.3 |
| 2001/0041567 A1 | 11/2001 | Morgan |
| 2003/0211854 A1 | 11/2003 | Mazzara, Jr. |
| 2004/0166828 A1 * | 8/2004 | Yosioka ...................... 455/344 |
| 2004/0192404 A1 * | 9/2004 | Zenios et al. ............ 455/569.1 |
| 2004/0203692 A1 | 10/2004 | Schwinke et al. |
| 2005/0064861 A1 * | 3/2005 | Nishida ...................... 455/420 |
| 2005/0129208 A1 | 6/2005 | McGrath et al. |

FOREIGN PATENT DOCUMENTS

EP   0497203 B1   7/1998

* cited by examiner

Primary Examiner—Edward F. Urban
Assistant Examiner—Nhan T. Le
(74) Attorney, Agent, or Firm—Brian M. Mancini; Gary J. Cunningham

(57) ABSTRACT

A system and method of providing service for a Telematics communication device includes a first step of providing a vehicular radiotelephone communication system including a cellular radiotelephone network for connecting the communication device with a service operator. The communication device includes a controller pre-programmed with a hotlined analog telephone number and a cleared digital telephone number if so equipped. A next step includes placing a call by the communication device using the hotlined analog telephone number. A next step includes determining whether the communication device has a service contract in place with the service operator, wherein if the communication device does not have a service contract, switching the call to a voice recording, and wherein if the communication device does have a service contract, providing service for the communication device.

20 Claims, 2 Drawing Sheets

TELEMATICS HOTLINING PROCESS

FIELD OF THE INVENTION

The present invention relates to communication systems for vehicles and more specifically, to providing service for a communication system in a vehicle.

BACKGROUND OF THE INVENTION

Telematics devices have been introduced into vehicles to provide a simple and transparent technique for users to place calls. At installation, such as with a new vehicle, Telematics devices must first be setup for service, even though the Telematics unit is already operable. Service operators have set up a 'hotlining' process to automatically route calls directed to an entered telephone number, from a non-setup Telematics network access device, to a different telephone number indicating to the user that service must be setup first.

Specifically, hotlining is a mechanism within the service operator network which restricts the destination telephone number that calls from a particular Telematics network access device can be routed to. It is set up within the service operator network for each specific Telematics network access device related to a particular Telematics product/ business relationship. In other words, the service operator network always routes the call to a single destination telephone number regardless of the actual telephone number dialed, assuming the destination telephone number dialed is not 'cleared' (explained below). The telephone number that the hotlined call is routed to can be controlled by the cellular provider or the Telematics service operator. In practice, it is envisaged that the Telematics service operator will have sole responsibility to determine where the hotlined calls shall be routed. However, there are certain telephone numbers (e.g. 'cleared numbers') that the service operators must connect directly, even if the Telematics user does not have a service contract with the service operator.

Telematics products use 'cleared numbers' to ensure that calls placed from the Telematics unit reach the destination number 100% of the time. Cleared numbers are special telephone numbers that are set up with the cellular provider, often at an additional cost. Whenever the Telematics unit dials a cleared number, the call bypasses all authorization and authentication within the service operator network and is routed through to the destination. Cleared numbers override any hotlining mechanism within the network. This means that when calling a cleared number, the call will always be routed to that destination number regardless of any hotlining of the Telematics network access device in the vehicle. Telematics products already use multiple cleared numbers.

Despite the ability of cleared numbers to always ensure that the call is routed correctly, they do have several disadvantages. First, additional cost is charged by the cellular provider to the vehicle manufacturer for each cleared number. Second, the Telematics service operator has no control over calls to cleared numbers. A call will be sent through regardless of whether the Telematics user has a current business agreement (account) with the service operator or not. The service operator must absorb the cost to handle calls from Telematics units that do not generate revenue for them. Third, the Telematics service can not be turned off by the service operator. There is no way for the service operator to change the service for a single customer. For example, if a customer's service agreement and contract ends or expires, there is no way for the service operator to direct all future calls from that particular Telematics unit away from live help (to avoid cost) and to a voice recording, for example. Fourth, the Telematics module is not synchronized with the business arrangements between the service operator and the end user and therefore always attempts to dial the service operator on activation of a Telematics service, regardless of the state of these arrangements. This again leads to the service operator supporting calls and absorbing costs for an end user with which they have no business arrangement.

What is needed is a method and system that can overcome the above problems. In particular, it would be beneficial to minimizes or eliminate the use of cleared numbers and their associated disadvantages. It would also be of benefit to allow maximum control for the Telematics service operator to start and stop service based on the contract with the user, while satisfying cellular provider requirements. It would also be of benefit to allow the Telematics module to know the state of the business arrangements between the service operator and the end user and act accordingly, and thereby reduce or eliminate any opportunities for fraud (e.g. restrict the telephone numbers that the Telematics unit can actually dial and be routed to).

BRIEF DESCRIPTION OF THE DRAWINGS

The features of the present invention, which are believed to be novel, are set forth with particularity in the appended claims. The invention, together with further objects and advantages thereof, may best be understood by making reference to the following description, taken in conjunction with the accompanying drawings, in the several figures of which like reference numerals identify identical elements, wherein:

DETAILED DESCRIPTION OF THE PREFERRED EMBODIMENTS

The present invention provides a method and system that minimizes or eliminates the use of cleared numbers and their associated disadvantages. In addition, maximum control is provided for the Telematics service operator to start and stop service based on the contract with the user, while satisfying cellular provider requirements. The present invention also allows the Telematics module to know the state of the business arrangements between the service operator and the end user and act accordingly, and thereby reduce or eliminate any opportunities for fraud (e.g. restrict the telephone numbers that the Telematics unit can actually dial and be routed to.

Figure 1:
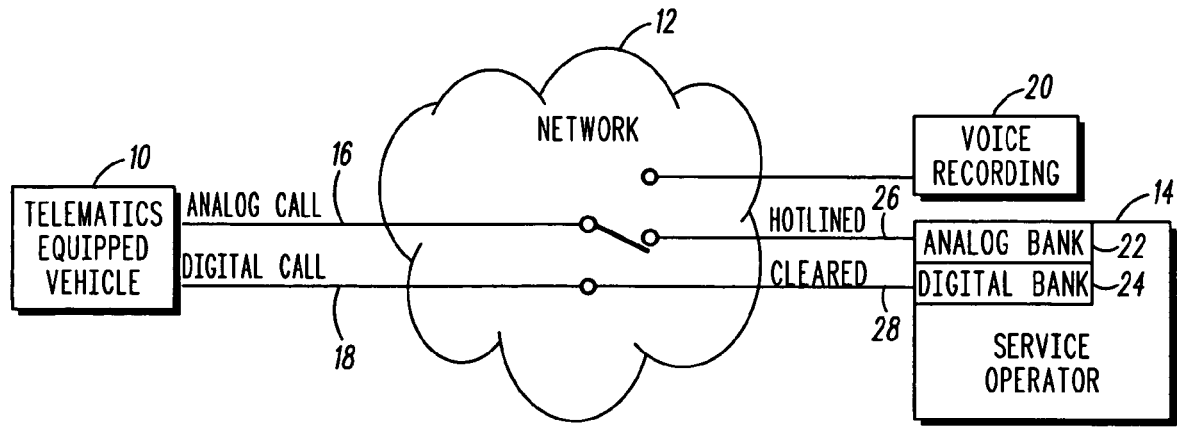
FIG. 1 shows a block diagram of a system overview, in accordance with the present invention.
Figure 2:
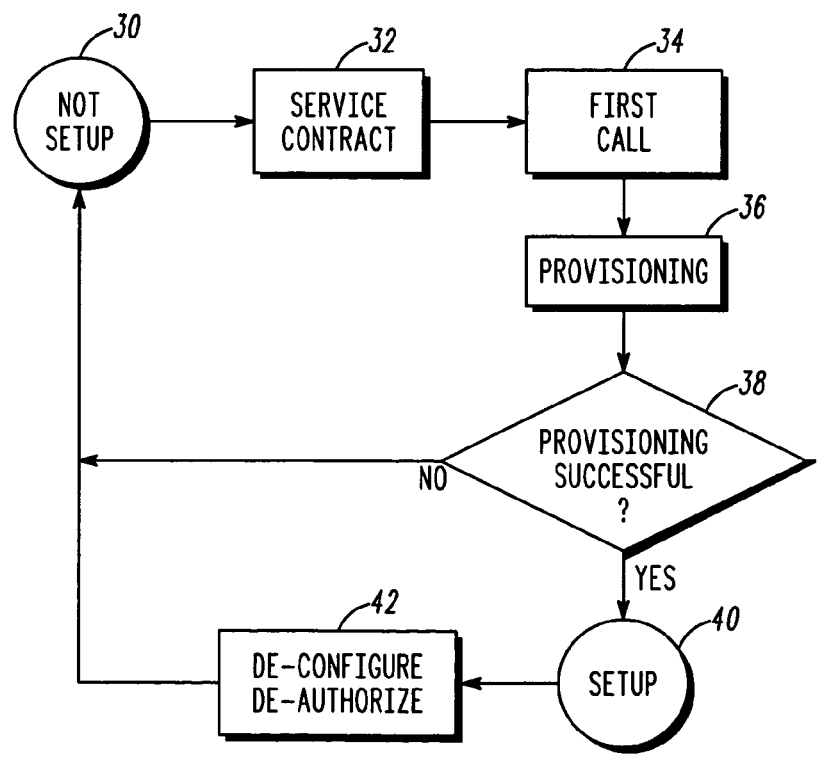
FIG. 2 shows a state diagram, in accordance with the present invention.

Referring to FIGS. 1 and 2, a system is shown for providing service for a vehicle that is equipped with a Telematics communication device 10. The system includes a radiotelephone network 12 that route telephone calls, and a service operator 14 operable to provide service for the Telematics communication device 10 depending upon a service contract. The Telematics communication device 10 includes a network access device (NAD) to perform the actual radio communication. The NAD includes a controller that can be pre-programmed with one or more telephone numbers that can be dialed with one touch of a button in the vehicle.

The present invention has primary application in those circumstances where a vehicle is first being connected for cellular radiotelephone service. For example, a purchaser of a new vehicle equipped within a Telematics device, such as OnStar™, will sign a service contract with an automobile dealer who will forward the contract to the OnStar™ service provider. However, service will not be setup until the first call from the Telematics communication device. Accordingly, the NAD of the Telematics communication device is preprogrammed with a "hotlined" analog telephone number obtained from the service provider. The first phone call from the Telematics communication device will be to this hotlined analog telephone number, in accordance with the present invention. Optionally, if the Telematics communication device is capable of digital operation, it can be pre-programmed with one or more "cleared" digital telephone number, which provide direct connections to the service operator 14 through the network 12.

There are several different service states that can exist for a Telematics communication device, which are individually addressed below. A first state includes a Telematics communication device that does not have a service contract in place and has not been setup for service (such as a vehicle on a dealer's lot). A second state includes a Telematics communication device that does have a service contract in place and has not yet been setup for service (such as a vehicle that has just been purchased). A third state includes a Telematics communication device that has a service contract in place and has been setup for service (such as a vehicle in normal service). A fourth state includes a Telematics communication device that does not have a service contract in place and has been setup for service (such as a vehicle where the service contract has lapsed).

The Telematics service operator maintains a list of all Telematics communication devices in the field (for all vehicles manufactured). In particular, the service operator maintains a list of identifiers that are specific for each device. This can include the devices individual Mobile Identification Number (MIN) used for network routing and Mobile Directory Number (MDN) which is the specific phone number embedded in each NAD. In addition, the Telematics service operator is capable of controlling (and changing) the analog hot-lining destination point for each individual Telematics communication device. The Telematics service operator also includes an analog information transfer destination bank for analog service for Telematics communication devices and a digital information transfer destination bank for digital service for Telematics communication devices, using Telematics communication protocols.

In the first state, where the Telematics communication device does not have a service contract in place and has not been setup for service 30, the service operator directs the network 12 to hot-line this Telematics communication device to a "non-live" destination point 20. Typically, this would be a voice recording 20 stating that the Telematics service can not be utilized and referring the customer to a particular phone number they can call to set up an account. In effect, this process ensures that the service operator never receives calls to a live operator from a Telematics unit that has no valid business account associated with it (i.e. the end user is not a subscriber). When reaching such a recording 20, no Telematics services are performed as the unit does not recognize the recording as the service. The Telematics communication device is in the "Not Setup" state 30 under these conditions.

In the second state, the Telematics communication device now has a service contract in place but has not been setup for service 32. The service contract results from completed business transactions between the service operator, end customer and dealership/manufacturer (i.e. account setup). At this point, the service operator 14 directs the network 12 to switch the hot-lining destination point 26 of an analog call from the Telematics communication device 10 from the default (e.g. voice recording 20) to the analog destination bank 22 at the service operator 14. Thereafter, when a subsequent analog Telematics call is triggered from the unit 34, the call is now hotlined 26 to the analog bank 22 rather than the default point 20 due to the hotlining change. When the call reaches the analog bank 22, the Telematics unit determines that the call has been routed to the analog bank of the service operator. In particular, the analog bank of the service operator 14 provides a modem tone (i.e. raise carrier) back to the Telematics communication device 10. In this way, the Telematics communication device 'knows' that the hot-lining has been switched and that it has now dialed the service operator 10. The Telematics device and service operator can then acknowledge service therebetween.

The behavior of the Telematics communication device depends on the network capability of the Telematics communication device (i.e. digital capable or only analog capable). If the Telematics communication device is only analog capable, the unit continues on with the Telematics call, wherein the modem tone is switched out, the analog voice line is opened, and the service operator provisions 36 the unit. If the Telematics communication device is digital capable, the unit hangs up the call, and redials the service operator using the cleared digital destination number(s) 28. Since these telephone numbers are cleared, the call will be routed directly to the service operator's digital information transfer destination bank 24. Once connected to the digital bank 24, the service operator provisions 36 the unit. In either case, during provisioning 36 the service operator authorizes and configures the Telematics communication device 10, using the Telematics protocol, in accordance with the service contract. If provisioning is not successful (e.g. the call is interrupted or there are other service problems), the Telematics communication device is returned to the "Not Setup" state 30.

Once provisioning 36 has been successfully performed, the Telematics communication device transitions to the third, "Setup" state 40 where future calls proceed normally directly from the Telematics communication device to the service operator 14 through either the analog bank using the hotlined telephone number or the digital bank through the cleared number. For all future operation, the Telematics unit is in the 'Setup' state and all restrictions placed on the unit when in the 'Not Setup' state are removed.

In the fourth state, where the service contract has been terminated (e.g. the end user has let the service contract lapse), the service operator will call the MDN of the NAD of the Telematics communication device 10, and provision the unit 10 by: de-authorizing and de-configuring 42 the unit, directing the unit to revert to using only the default hotlined analog telephone number (if the unit had been switched to the cleared digital telephone number), and directing the network to switch any calls from the identified Telematics communication device 10 from the hotlined analog line 26 to the voice recording line 20, wherein the Telematics communication device is now in the "Not Setup" state 30.

In the present invention, using a process of hot-lining, the number of cleared numbers needed for a Telematics service can be minimized without changes to the Telematics protocol and minimal changes to the Telematics module itself. In addition, calling restrictions are present within the network for the unit which eliminates the potential for fraud. The present invention allows a Telematics service operator to actively control whether or not a Telematics unit can call and reach a live operator by controlling the hot-lining. This control can be based on the state of the contract between the end user, service operator and vehicle dealership. The Telematics module can detect which network it is in when a Telematics call is initiated and which bank (analog or digital) the unit reaches at the service operator to determine which data transfer mechanism to use. Further, the Telematics module can detect that it has connected to the service operator as opposed to a voice recording which therefore synchronizes the state of the Telematics module with the state of the business relationship between the end user, vehicle manufacturer and service operator.

In accordance with the present invention, a Telematics module has two, new internal states which it can switch between to exhibit different behaviors based on which hot-lining destination the module has been pointed to by the service operator (and hence the state of the business relationship). By using a combination of hot-lined and cleared numbers (and still keeping the cleared numbers to a minimum); the reliability of the system is increased to protect against network problems by providing redundancy.

The present invention eliminates the problems caused by the use of cleared numbers by not using cleared numbers at all in the aforementioned solution. Otherwise, since the Telematics unit has two distinct destination points at the Telematics service operator (one for analog technology and one for digital technology), eliminating the use of cleared numbers would require that the hot-lining mechanism allow two different destination numbers for routing the telephone phone call. In this undesired case, the mechanism would have to dynamically route the call based on the network that the Telematics unit is dialing the call from, which would be a complex problem and not something that is likely to be changed within the cellular network. The present invention solves this problem by directing all first calls 34 from the Telematics communication device to a hotlined analog telephone line.

Figure 3:
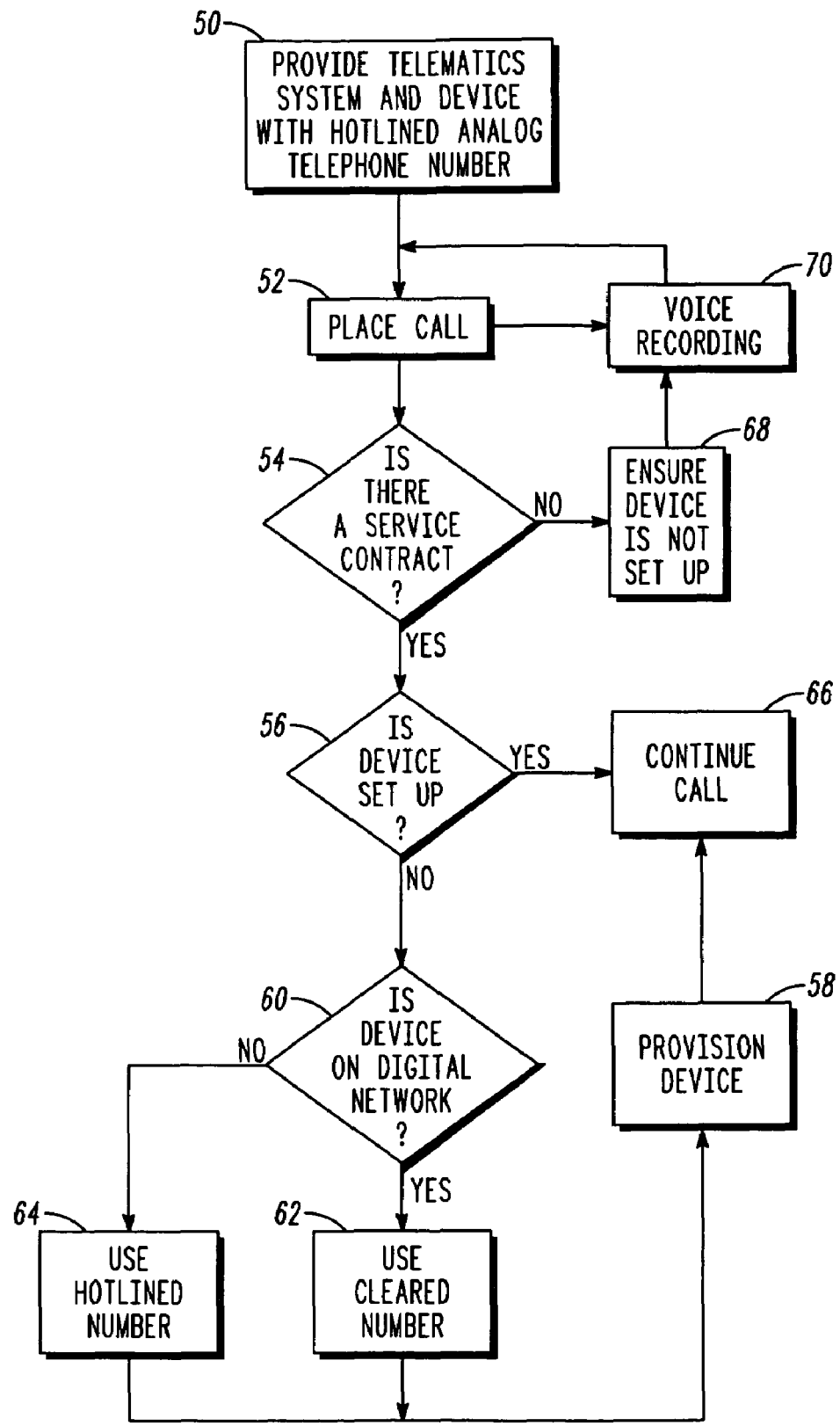
FIG. 3 is a flow chart of a method in accordance with the present invention.

Referring to FIG. 3 the present invention also provides a method of providing service for a Telematics communication device. A first step 50 includes providing a vehicular radiotelephone communication system including a cellular radiotelephone network for connecting the communication device with a service operator. The communication device includes a controller pre-programmed with at least one hotlined analog telephone number, and possibly one or more cleared digital telephone numbers.

A next step 52 includes placing a call by the communication device using the hotlined analog telephone number. Actions taken hereinafter are dependent upon two independent states: whether or not the Telematics communication device has a service contract in force, and whether or not the Telematics communication device is set up for service or not.

A next step 54 includes determining whether the communication device has a service contract in place with the service operator. In practice, this step includes reading an identification of the communication device and comparing that identification with a list of device identifications that have been set up for service. Further, this step can include switching the destination of the hotlined analog telephone call from the voice recording 70 to an analog information transfer data bank of the service operator.

A next step 70 includes switching the call to a voice recording if the communication device does not have a service contract. Typically, the voice recording can state that the Telematics service can not be utilized and refers the customer to a particular phone number they can call to set up an account. In effect, this process ensures that the service operator never receives calls to a live operator from a Telematics unit that has no valid business account associated with it (i.e. the end user is not a subscriber).

A next step includes providing service for the communication device if the communication device does have a service contract. This step includes many substeps. If the device has a service contract and is already set up, then the device is connected 66 to the service operator. However, if the device has a service contract, but it has not yet been set up, the device is then to be set up. At this point, the service operator directs the network to switch the hot-lining destination point of the call from the Telematics communication device from the default (e.g. voice recording) to the analog destination bank at the service operator. The service provider then provides a modem tone to the Telematics communication device such that the device "knows" that it has been connected to the service operator instead of the voice recording 70. A next substep 60 includes determining whether the communication device is operable on a digital radiotelephone network.

If the communication device is only operable on an analog network, the communication device is directed to use the analog hotlined telephone number 64 to switch from a modem line to a voice line to the service operator, wherein the communication device is provisioned 58 by the service operator to configure and authorize service for the communication device, and the call is continued 66. The direction to use the hotlined telephone number is performed by the communication device. The communication device directs itself to use the analog hotlined telephone number, and the modem line is switched to a voice line in accordance with Telematics protocols.

If the communication device is operable on a digital radiotelephone network, a next substep 62 is directing the communication device to hang up the call to the analog telephone number and use a cleared digital telephone number to contact 66 the service operator, wherein the communication device is provisioned 58 by the service operator to configure and authorize service for the communication device, and the call is continued 66. The communication device will hang up the analog telephone call, and then redial using the cleared number to the service operator.

The provisioning step 58 can include acknowledging service between the communication device and service operator. If the communication device is operable on a digital radiotelephone network 60, once the Telematics communication device is provisioned, all future calls from the Telematics communication device to the service operator are placed using the cleared digital telephone number using the Telematics protocol. Whereas, if the communication device is operable on an analog radiotelephone network 60, once the Telematics communication device is provisioned, all future calls from the Telematics communication device to the service operator are placed using the hotlined analog telephone number. If provisioning is not successful (e.g. the call is interrupted or there are other service problems), the Telematics communication device is returned to a "Not Setup" state.

When using a digital, cleared telephone number, calls are directly routed to the service operator without checking for a service contract or whether the device has been set up. However, if it is found by the service operator that a service contract has been terminated, the service operator can ensure 68 that the Telematics communication device is not set up by provisioning of the communication device by the service operator to de-configure and de-authorize service for the communication device upon termination of a service contract, whereupon the communication device reverts to use of the hotlined analog telephone number only. In this case, any future calls are switched to the voice recording 70.

In summary, the present invention is predicated on the Telematics communication device of a vehicle implementing two additional internal states: "Not Setup" and "Setup". The Telematics unit implements restrictions on the dialing of numbers based on the internal state that the unit is in. The Telematics unit always uses a hotlined analog telephone number for first contact with a service provider, even if the unit is operable on a digital radiotelephone network. Thereafter, the Telematics unit can use a higher priority cleared digital telephone number after being set up. Under no circumstances is the Telematics unit to initially dial the 'cleared' digital destination number(s). Due to this hotlining of the unit, all calls will be routed by the network to a point decided by the Telematics service operator.

Once the unit is in the "Setup" state, all restrictions placed on the unit when in the "Not Setup" state are removed and the unit behaves as per specification. For example, if in an analog network and Telematics service is activated, the unit dials the analog destination number(s), and if in a digital network and Telematics service is activated, the unit dials the digital destination number(s). Due to the hotlining of the unit, all calls dialed that do not use the "cleared" numbers (that is all analog destination number(s)) will be routed to a point decided by the Telematics service operator (i.e. the analog bank).

While the present invention has been particularly shown and described with reference to particular embodiments thereof, it will be understood by those skilled in the art that various changes may be made and equivalents substituted for elements thereof without departing from the broad scope of the invention. In addition, many modifications may be made to adapt a particular situation or material to the teachings of the invention without departing from the essential scope thereof. Therefore, it is intended that the invention not be limited to the particular embodiments disclosed herein, but that the invention will include all embodiments falling within the scope of the appended claims.

What is claimed is:

1. A method of providing service for a Telematics communication device, the method comprising the steps of:
   providing a vehicular radiotelephone communication system including a cellular radiotelephone network for connecting the communication device with a service operator, the communication device having a controller pre-programmed with at least a hotlined analog telephone number;
   determining whether the communication device is operable on an analog or digital radiotelephone network, wherein if the communication device is operable on a digital radiotelephone network, directing the communication device to use a cleared digital telephone number to contact the service operator, and wherein if the communication device is operable on an analog radiotelephone network only, directing the communication device to use the hotlined analog telephone number to contact the service operator;
   placing a call by the communication device using the hotlined analog telephone number; and
   determining whether the communication device has a service contract in place with the service operator,
   wherein if the communication device does not have a service contract, switching the call to a voice recording, and
   wherein if the communication device does have a service contract, providing service for the communication device.

2. The method of claim 1, wherein the determining step includes reading an identification of the communication device and comparing that identification with a list of device identifications that have been set up for service.

3. The method of claim 1, further comprising:
   provisioning of the communication device by the service operator to configure and authorize service for the communication device, after the determining step.

4. The method of claim 3, further comprising the steps of:
   presenting a modem tone to the communication device; and
   wherein if the communication device is operable on a digital radiotelephone network, terminating the call and having the communication device redial the service operator using the cleared digital telephone number, and
   wherein if the communication device is operable on an analog radiotelephone network only, connecting the communication device to the service operator using the hotlined analog telephone number.

5. The method of claim 4, wherein if the communication device is operable on a digital radiotelephone network, further comprising the substep of having the communication device place all future calls to the service operator using the cleared digital telephone number using the Telematics protocol, once provisioned.

6. The method of claim 4, wherein the step of connecting the communication device to the service operator using the hotlined analog telephone number includes switching from a modem line to a voice line.

7. The method of claim 1, further comprising the step of provisioning of the communication device by the service operator to de-configure and de-authorize service for the communication device upon termination of a service contract, whereupon the communication device reverts to use of the hotlined analog telephone number only.

8. A method of providing service for a Telematics communication device, the method comprising the steps of:
   providing a vehicular radiotelephone communication system including a cellular radiotelephone network for connecting the communication device with a service operator, the communication device having a controller pre-programmed with at least a hotlined analog telephone number;
   placing a call by the communication device using the hotlined analog telephone number; and
   determining whether the communication device has a service contract in place with the service operator,
   wherein if the communication device does not have a service contract, switching the call to a voice recording, and
   wherein if the communication device does have a service contract, determining whether the communication device is operable on a digital radiotelephone network, and provisioning of the communication device by the service operator to configure and authorize service for the communication device wherein, if the communication device is operable on a digital radiotelephone network directing the communication device to use a cleared digital telephone number to contact the service operator, and if the communication device is operable on an analog radiotelephone network only, directing the communication device to use the hotlined analog telephone number to contact the service operator.

9. The method of claim 8, wherein the determining step includes reading an identification of the communication device and comparing that identification with a list of device identifications that have been set up for service.

10. The method of claim 8, further comprising the steps of:
  presenting a modem tone to the communication device; and
  acknowledging service between the communication device and service operator,
  wherein if the communication device is operable on a digital radiotelephone network, terminating the call and having the communication device redial the service operator using the cleared digital telephone number, and
  wherein if the communication device is operable on an analog radiotelephone network only, connecting the communication device to the service operator using the hotlined analog telephone number where the service operator provisions service for the communication device.

11. The method of claim 10, wherein if the communication device is operable on a digital radiotelephone network, further comprising the substep of having the communication device place all future calls to the service operator using the cleared digital telephone number using the Telematics protocol.

12. The method of claim 10, wherein the step of connecting the communication device to the service operator using the hotlined analog telephone number includes switching from a modem line to a voice line.

13. The method of claim 8, further comprising the step of provisioning of the communication device by the service operator to de-configure and de-authorize service for the communication device upon termination of a service contract, whereupon the communication device reverts to use of the hotlined analog telephone number only.

14. A system for providing service for a Telematics communication device, the system comprising:
  a radiotelephone network that route telephone calls;
  a service operator operable to provide service for the Telematics communication device depending upon a service contract;
  a hotlined analog telephone number;
  a network access device of the Telematics communication device, the network access device having a controller pre-programmed with the hotlined analog telephone number;
  an analog information transfer destination bank controlled by the service operator; and
  a voice recording,
  wherein upon a call from the communication device using the hotlined analog telephone number, the service operator determines whether the communication device has a service contract in place with the service operator such that the service operator directs the network to switch the call to the voice recording if the communication device does not have a service contract and directs the network to switch the call to the analog information transfer destination bank if the communication device does have a service contract.

15. The system of claim 14, wherein the service operator reads an identification of the communication device from the network and compares that identification with a list of device identifications that have been set up for service.

16. The system of claim 14, further comprising a digital information transfer destination bank and a cleared digital telephone number, wherein if a service contract is in place a determination is made of whether the communication device is operable on a digital radiotelephone network, wherein if the communication device is operable on a digital radiotelephone network, the cleared digital telephone number is used to connect to the digital information transfer destination bank, and wherein if the communication device is operable on an analog radiotelephone network only, the hotlined analog telephone number is used to connect to the analog information transfer destination bank.

17. The system of claim 16, wherein, if a service contract is in place, the service operator presents a modem tone to the communication device through the network and if the communication device is operable on a digital radiotelephone network, the communication device terminates the analog call and redials the service operator using the cleared digital telephone number to the digital information transfer destination bank wherein the service operator provisions service for the communication device, and if the communication device is operable on an analog radiotelephone network only, the call continues to the analog information transfer destination bank using the hotlined analog telephone number wherein the service operator provisions service for the communication device.

18. The system of claim 17, wherein if the communication device is operable on a digital radiotelephone network, the communication device places all future calls to the service operator using the cleared digital telephone number using the Telematics protocol to the digital information transfer destination bank.

19. The system of claim 17, wherein the service operator connects the communication device to the service operator using the hotlined analog telephone number by directing the network to switch from the modem line to a voice line to the analog information transfer destination bank.

20. The system of claim 14, wherein the service provider can also perform provisioning of the communication device through the network to de-configure and de-authorize service for the communication device upon termination of a service contract, whereupon the communication device reverts to use of the hotlined analog telephone number only.

* * * * *